United States Patent Office.

MARTIN HERZBERG, OF ELBERFELD, GERMANY, ASSIGNOR TO THE FARBENFABRIKEN, VORMALS FR. BAYER & COMPANY, OF SAME PLACE.

MANUFACTURE OF DYE-STUFFS.

SPECIFICATION forming part of Letters Patent No. 384,315, dated June 12, 1888.

Application filed February 21, 1888. Serial No. 264,831. (Specimens.)

*To all whom it may concern:*

Be it known that I, MARTIN HERZBERG, doctor of philosophy, a subject of the Emperor of Germany, residing at Elberfeld, Prussia, Germany, assignor to the Farbenfabriken, vormals Fr. Bayer & Company, have invented new and useful Improvements in the Manufacture of Dye-Stuffs or Coloring-Matters, of which the following is a specification.

This invention relates to the manufacture of new brown coloring-matters for dyeing cotton, wool, and silk by combining diazo or tetrazo compounds with dye-stuffs well known in commerce under the name of "Bismarck brown," (triamidoazo-benzol or triamidoazotoluol.) These dyes are obtained, according to this invention, by causing an aqueous solution of the diazo or tetrazo compounds of aniline, toluidine, xylidine, cumidine, and the nitro-derivatives of the same, amidoazobenzol, amidoazo-toluol, amidoazo-xylol, and alpha and beta naphthylamine, benzidine, benzidine-sulphon, tolidine, tolidin-sulphon, diamido-stilbene, and their sulphonic or carbonic acids, to flow into an aqueous solution of Bismarck brown.

The dyes obtained by the action of diazo or tetrazo compounds with triamidoazo-benzol or triamidoazo-toluol, which have no sulpho or carbo acid group, are only soluble in alcohol and are rendered soluble in water by a sulphonating process, such as a treatment with sulphuric acid or other sulphating agents. These derivatives of Bismarck brown dye unmordanted cotton in a boiling soap bath containing alkali like those of tetrazo compounds a splendid brown color.

The processes next described herein serve to show how the dyes may be manufactured in practice according to my invention.

First example: 6.6 kilos of hydrochlorate of benzidine are converted in the well-known manner into the muriatic tetrazo compound. The solution of the same is slowly poured, under continuous stirring, into a solution containing one hundred kilos of Bismarck brown, (triamidoazo-benzol.) After having settled for about twelve hours, sodium acetate is added. A brown insoluble precipitate is then formed, representing the dye resulting therefrom, soluble in spirit. This is filtered and dried. In order to render soluble in water the thus formed dye-stuff, about fifty parts, by weight, of the carefully-dried above-gained dye are introduced, while continually stirring slowly, into three times the quantity of fuming sulphuric acid containing about twenty per cent. of anhydride at a temperature of about 15° centigrade. The mixture thus obtained is allowed to stand at ordinary temperature until the action of the sulphuric acid is complete—*i. e.*, until a sample taken from the melt entirely dissolves in water containing ammonia. The materials are then poured into ice, and the new-formed sulpho-acid is filtered off and converted into its alkali salt by treatment with alkalies.

Second example: 8.5 kilos of naphthylamine sulphonic acid are converted in the well-known manner into the muriatic diazo compound. The same is slowly poured, under continuous stirring, into a solution containing forty kilos of pure Bismarck brown, (triamidoazo-benzol.) After having stood for about twelve hours, the thus-formed muriatic mixture is then made alkaline by sodium carbonate and heated to boiling. A brown solution is formed, representing the formed dye, soluble in water. It is filtered in order to separate from the base of Bismarck brown triamidoazo-benzol, which has formed, but not taken part in the reaction of dye formation. Out of the filtered solution the dye is then isolated in the form of a brown powder by salt-pressing and drying.

Having thus described my invention, I claim as new and desire to secure by Letters Patent—

1. The process herein described of making new brown dye-stuffs, which consists in combining the salts of diazo compounds of aniline, toluidine, xylidine, cumidine, and the nitro-derivatives of the same, amidoazo-benzol, amidoazo-toluol, amidoazo-xylol, alpha and beta naphthylamine, or their sulpho and carbo acids, and tetrazo compounds of benzidine, benzidine-sulpho, tolidine, diamido-stilbene, or their sulpho or carbo acids, with Bismarck brown, (triamidoazo-benzol or triamidoazo-toluol,) substantially as hereinbefore described.

2. The rendering of the insoluble colors obtained as aforesaid soluble in water by a sulphonating process, substantially as hereinbefore described.

In testimony whereof I have signed my name to this specification in the presence of two witnesses.

MARTIN HERZBERG.

Witnesses:
ANTON KEUTER,
OTTO KRAUSE.